March 14, 1944.  J. J. MAHONEY, JR  2,343,988
CATHODE RAY INTENSITY CONTROL CIRCUIT
Filed Feb. 24, 1943
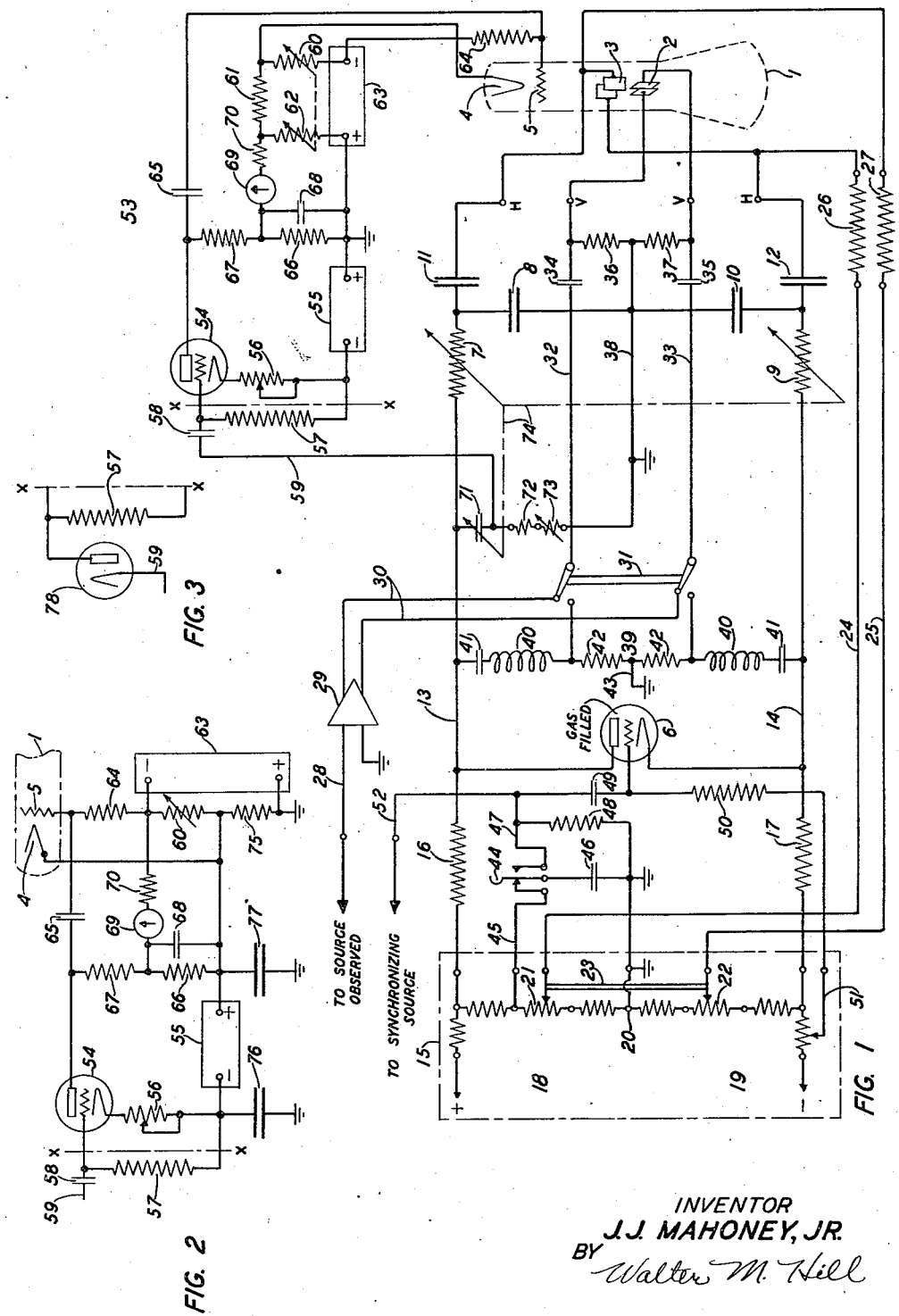
*INVENTOR*
*J.J. MAHONEY, JR.*
BY
*Walter M. Hill*
ATTORNEY Patented Mar. 14, 1944

2,343,988

UNITED STATES PATENT OFFICE 2,343,988.

CATHODE RAY INTENSITY CONTROL CIRCUIT

John J. Mahoney, Jr., Lynbrook, N. Y., assignor to Bell Telephone Laboratories, Incorporated, New York, N. Y., a corporation of New York Application February 24, 1943, Serial No. 476,945

12 Claims. (Cl. 315—30)

This invention relates to cathode ray oscilloscope circuits and more particularly to beam intensity control and metering circuits therefor.

It is very often desirable to make photographic records of oscillograms produced by cathode ray oscilloscopes. In order to insure that a satisfactory exposure will be made it is necessary to increase the intensity of the beam a definite amount as the velocity of the sweep is increased. For photographic reasons it is usually quite necessary that the beam maintain a rather uniform high intensity throughout the oscillogram. Such high intensities if maintained are destructive of the oscilloscope screen and to protect the screen it is customary to suppress the beam or to extinguish it entirely until the instant the oscillogram is to start. At the instant the sweep is initiated the beam is automatically turned on to form the oscillogram. In making photographic oscillograms with cathode ray oscilloscopes in which the beam is extinguished until the sweep is initiated it is of considerable importance to know what the intensity of the beam will be before making the exposure. The circuits of this invention provides by direct reading on a meter a predetermined indication of what the beam intensity will be.

It is the object of this invention to provide a beam-intensity control and metering circuit for a cathode ray oscilloscope incorporating an easily operated intensity control for predetermining the intensity of the beam.

The foregoing object is achieved by this invention by providing for a cathode ray oscilloscope system of the type employing a cathode and a beam intensity modulating grid, the combination of two sources of direct current voltage one of which provides the normal extinction bias for its cathode ray beam while the other source of voltage provides a measured amount of voltage bias for producing a predetermined beam intensity during the time the cathode ray oscilloscope is active, and a meter adapted to indicate the difference in voltage between said two voltage sources as a measure of the intensity of the beam.

The invention may be better understood by referring to the accompanying drawing in which:

Fig. 1 illustrates an oscillograph circuit embodying a preferred form of beam control circuit in accordance with this invention;

Fig. 2 illustrates a modified embodiment of the beam control circuit of this invention; and Fig. 3 illustrates a modification of the beam release coupling circuits of Figs. 1 and 2.

Referring now more particularly to Fig. 1 th cathode ray oscillograph tube I is disclosed in connection with a preferred form of beam deflector circuit. This beam deflector circuit is more particularly described in connection with applicant's copending application, Serial No. 476,944, filed on even date herewith. However, for the purposes of this invention the operation of this portion of the circuit will be briefly described.

Cathode ray oscilloscope I has vertical and horizontal beam deflector plates 2, 2 and 3, 3, respectively. A sweep circuit for the horizontal beam deflector plate comprises sweep condensers 8 and 10 connected in a series circuit with power source 15 through resistors 16, 7, 9 and 17. Prior to initiating the sweep power source 15 charges condensers 8 and 10 to the voltage of the power source through the series resistor circuit just described. It will be noted that the sweep deflector condensers 8 and 10 are connected in a balanced to ground circuit arrangement by reason of grounded conductor 38 and the grounded mid tap 20 in the power source 15. Coupling condensers 11 and 12 couple the horizontal plates of the oscilloscope to the sweep condensers 8 and 10. A gas-filled tube 6 is connected with its anode and cathode to conductors 13 and 14 in the charging circuit. To initiate the sweep a synchronizing pulse is received from circuit 52 through coupling condenser 49 causing the gas-filled tube 6 to discharge. This places a substantial short between conductors 13 and 14 thereby causing sweep condensers 8 and 10 to discharge through series-connected resistors 7 and 9. The resulting charge in voltage on sweep condensers 8 and 10 produces a sweep voltage for the horizontal plates 3, 3 of the oscilloscope I. The synchronizing pulse is customarily associated in some way electrically with the source to be observed which is received over a circuit 28, amplified by amplifier 29 and transmitted to the vertical deflector plates 2, 2 over circuit 30 and conductors 32 and 33. The simultaneous transmission of the phenomenon to the vertical plates and the initiation of the sweep produces the oscillogram on the oscilloscope screen in a manner well known to the art.

The sweep circuit just described has a self-contained sweep velocity timing circuit comprising inductors 40, 40, capacitors 41, 41 and resistors 42, 42. The inductors and capacitors comprise a single series resonant circuit tuned to a suitable timing frequency and this circuit is connected across the plate and cathode of the gas-filled tube 6. Simultaneous with the charging of sweep capacitors 8 and 10 capacitors 41, 41 are also charged from source 15 through resistors 16 and 17. Upon the discharge of gas-filled tube 6, an oscillatory discharge takes place through this series resonant circuit producing a timing voltage across resistors 42, 42. In order to use this circuit for calibrating the velocity of the sweep, switch 31 is moved to its downward position thereby coupling circuit 39 to the vertical oscilloscope plates. Gas-filled tube 6 is then operated manually by operating switch 44 which discharges capacitor 46 through resistor 48 thereby applying a positive pulse through coupling condenser 49 to the grid of gas-filled tube 6. Condenser 46 was previously charged through the normally closed contacts of switch 44 and conductor 45 from power source 15. It will be understood that upon the operation of switch 44 and the discharge of gas-filled tube 6 the oscillatory discharge of the timing circuit including inductors 40, 40 and capacitors 41, 41 as previously described takes place.

To protect the oscilloscope screen it is essential that the cathode ray be suppressed to extinction until the sweep is initiated. Also if the beam is not suppressed the photosensitive film will be fogged, a distracting spot will remain on the screen prior to the sweep and a confusing return trace will appear on the screen. Beam extinction is accomplished in accordance with this invention by applying a normal bias to control grid 5 of the oscilloscope tube 1 from a voltage drop derived from resistor 60 associated with direct current power source 63. The entire beam control circuit is represented generally by reference numeral 53 which comprises two direct current power sources 55 and 63. In circuit with source 55 are series-connected resistors 66 and 67 which are preferably of equal resistance, a vacuum tube triode 54, and an adjustable cathode resistor 56. Resistor 66 is by-passed with a capacitor 68. The grid of tube 54 is coupled to the lower end of cathode resistor 56 by means of resistor 57. It is well known that the space current through tube 54 may be adjusted over a wide range by adjusting cathode resistor 56. In circuit with direct current power source 63 is a resistance network comprising resistors 60, 61 and 62. Resistors 60 and 62 are kept equal and are both adjustable through a gang adjustment as schematically indicated in the drawing. Consequently, the voltage drop across resistor 60 is always equal to the voltage drop across resistor 62. A coupling condenser 65 is connected between the grid 5 of oscilloscope 1 and the upper end of resistor 67 in the beam control circuit. A direct current meter 69, preferably of the zero center type, is connected between the upper end of the variable resistor 62 and the upper end of resistor 66 through a series resistor 70. It is evident that direct current meter 69 will indicate the difference between the voltage drops in resistors 62 and 66.

Capacitor 71 and resistors 72 and 73 are serially connected between conductor 13 and ground in the sweep circuit. Capacitor 71 is normally charged with its upper plate positive at the same time the sweep condenser 8 is charged and upon the discharge of gas-filled tube 6 this condenser discharges through resistors 72 and 73. The result is that a strong negative pulse is transmitted over conductor 59 through capacitor 58 to the control grid of tube 54. This pulse is sufficiently strong to block the flow of electrons through tube 54 and consequently substantially instantaneously cause the voltage drop across resistor 67 to disappear. The time constant of capacitor 71 and series-connected resistors 72 and 73 is sufficiently long to maintain tube 54 in a blocked condition throughout the sweep period. When the sweep velocity is changed by varying resistors 7 and 9 in the sweep circuit the capacity of capacitor 71 should also be changed to vary the time constant of that circuit in order to insure that the blocking pulse will be maintained throughout the sweep period. This is achieved by ganging variable capacitor 71 with the variable resistors 7 and 9 through ganging control 74.

The beam control circuit just described is operated in the following manner: With normal voltages in all of the electrodes of oscilloscope 1 some of which are not shown in Fig. 1 for the sake of clarity, the beam is biased to extinction by adjusting variable resistor 60. Having previously determined the velocity of the sweep, cathode resistor 56 is next adjusted until meter 69 indicates a sufficient difference voltage between the drop in resistor 62 and the drop in resistor 66 to produce the necessary beam intensity to form a trace on the photographic sensitive material to be employed. When a synchronizing pulse is received over circuit 52 thereby causing gas-filled tube 6 to discharge, the strong negative pulse previously described is transmitted over circuit 59 to suddenly block the flow of electrons through tube 54. This causes the flow through series resistor 67 to suddenly stop and thereby the drop across this resistor instantaneously disappears. The drop across resistor 66, however, is maintained by reason of its shunting condenser 68. This results in a positive pulse being transmitted to the control grid 5 of oscilloscope 1 over capacitor 65. The time constant of resistor 65 and capacitor 68 is substantially equal to the time constant of capacitor 65 and resistor 64. This maintains the ignition pulse on beam control grid 5 rather uniform over an appreciably longer period of time than the normal time constant of either one of the circuits.

That the indication of meter 69 will be a measure of the beam intensity will be evident when it is remembered that the voltage drop across resistor 62 is always equal to the normal beam extinction voltage drop across resistor 60 and that with resistors 66 and 67 of equal resistance, the voltage drops thereacross are also equal to each other. The grid 5 will always change in voltage by an amount equal to the voltage drop across resistor 67 which disappears when tube 54 is suddenly blocked. If, for example, resistor 56 is adjusted so that current through tube 54 is negligibly small then the voltage drop across resistor 67 is likewise negligible. Meter 69 will indicate a voltage equal to the drop across resistor 60 which means that the bias on grid 5 will remain at the beam extinction value when the oscillograph is operated. Consequently, if tube 54 is suddenly blocked the bias voltage of grid 5 will remain substantially unchanged. By way of another example, if resistor 56 is adjusted until the voltage drop across resistor 66 is four volts less than the voltage drop across resistor 60, meter 69 will read four volts. This means that the voltage swing of grid 5 will be four volts short of reducing the grid bias to zero, or, in other words, the bias voltage will be four volts during the subsequent operation of the oscilloscope. It will thus be seen that meter 69 always reads the bias voltage which will exist on the beam intensity grid 5 during the exposure of the oscillogram and can therefore be utilized for predetermining the intensity of the cathode beam.

The circuit shown in Fig. 2 is a modified arrangement of the beam control circuit 53 of Fig. 1 but operates in accordance with the same principle. The circuit of Fig. 2 requires power source 55 to be insulated from ground, the positive pole being below ground potential by the voltage drop in resistor 75. This circuit, however, simplifies the meter circuit somewhat in that the rheostat 62 ganged with the rheostat 60 in Fig. 1 is eliminated leaving only rheostat 60. Also the voltage on the relatively small condenser 65 is greatly reduced. In Fig. 1 this condenser normally has a potential equal to the voltage of high voltage source 63, less the voltage drop in resistors 66 and 67 while in Fig. 2 the potential on this condenser is equal only to the drop across resistors 66 and 67 less the normal bias drop on resistor 60 which results in a voltage very much less than for the circuit of Fig. 1. This greatly reduces the insulation requirements for condenser 65 and permits the use of a small condenser which is of considerable advantage in this type of circuit.

As previously stated the circuit arrangement of Fig. 2 makes unnecessary the use of a ganged rheostat 62. In this figure the normal beam cut-off bias voltage drop across resistor 60 is compared directly with the voltage drop across resistor 66 and for this purpose meter 69 with its series resistor 70 is connected directly between the upper end of resistor 60 and the upper end of resistor 66. Direct current power supply 63 is accordingly reversed in polarity with respect to resistor 60 so as to cause the upper end of resistor 60 to be negative with respect to its lower end. Instead of resistors 61 and 62 of Fig. 2 a single resistor 75 is connected in series with power source 63 and resistor 60. It will be understood, of course, that the invention may be practiced by using a lower voltage source for source 63 and thereby eliminating the necessity for resistor 75. However, a high voltage source such as source 63 is necessary to supply other voltages for the other electrodes in the cathode ray oscilloscope tube 1 and for this purpose resistor 75 forms part of the high voltage bleeder network for these other electrodes. This same function is performed by resistor 61 in Fig. 1.

Since in Fig. 2 the power source 55 must be insulated from ground a suitable path to ground must be provided for the transient pulse transmitted to the grid circuit of tube 54. This is furnished by capacitor 76 of relatively large capacity. It will thus be seen that the strong negative pulse transmitted from the upper end of resistor 72 of Fig. 1 passes over conductor 59 shown in Fig. 2 to capacitor 58, through resistor 57 and back to the grounded side of resistors 72, 73 through capacitor 76. Power source 63 customarily provides by-pass condensers for its bleeder resistors. However, it may be advisable to add another capacitor 77 from the positive side of power source 55 to ground.

During the charging period of capacitor 71 a strong positive pulse is transmitted over conductor 59 to the grid of tube 54, resulting in the flow of a large space current through tube 54.

In Fig. 3 the transmission of this undesired positive pulse is blocked by substituting a diode 78 in place of capacitor 58 of Figs. 1 and 2. The unilateral conductivity of the diode permits current transmission in only one direction.

It has been stated that if resistor 66 is made equal to resistor 67 and resistor 60 kept equal to resistor 62, meter 69 will read directly the bias voltage which will exist on grid 5 during the sweep period. While this is the preferred design, it is also possible to simply keep the ratio of the resistances of 66 to 67 equal to the ratio of the resistances of 62 to 60. Meter 69 will still read proportionately but must be recalibrated if actual voltage readings are wanted. For oscillographic purposes, however, it is only necessary to calibrate the meter readings in terms of sweep velocities.

What is claimed is:

1. In an oscilloscope circuit of the type employing a cathode and a beam intensity modulating grid, a beam intensity control and metering circuit therefor comprising an adjustable source of grid bias voltage connected to the cathode and to the modulating grid, a second voltage source, a vacuum tube repeater having a space current path, two resistors connected in series and in series with the second voltage source and the space current path, a capacitor shunting one of said two resistors, space current control means for the repeater, an input circuit for the repeater capable of blocking the space current upon receiving a voltage pulse of predetermined magnitude, a meter, a circuit connecting the meter with said bias adjusting means and said shunted resistor to cause the meter to indicate their difference voltage, and a circuit coupling the unshunted one of said two resistors to the modulating grid whereby upon suddenly blocking the space current said modulating grid will be brought to a less negative voltage of magnitude predetermined by the meter reading.

2. In an oscilloscope circuit of the type employing a cathode and a beam intensity modulating grid, a beam intensity control and metering circuit therefor comprising an adjustable source of grid bias voltage connected to the cathode and to the modulating grid, a second voltage source, a vacuum tube repeater having a space current path, two resistors of equal resistance connected in series and in series with the second voltage source and the space current path, a capacitor shunting one of said two resistors, space current control means for the repeater, an input circuit for the repeater capable of blocking the space current upon receiving a voltage pulse of predetermined magnitude, a meter, a circuit connecting the meter with said bias adjusting means and said shunted resistor to cause the meter to indicate their difference voltage, and a circuit coupling the unshunted one of said two resistors to the modulating grid whereby upon suddenly blocking the space current said modulating grid will be brought to a less negative voltage of magnitude predetermined by the meter reading.

3. In an oscilloscope circuit of the type employing a cathode and a beam intensity modulating grid, a beam intensity control and metering circuit therefor comprising an adjustable source of grid bias voltage connected to the cathode and to the modulating grid, a second voltage source, a vacuum tube repeater having a space current path, two resistors connected in series and in series with the second voltage source and the space current path, a capacitor shunting one of said two resistors, space current control means for the repeater, an input circuit for the repeater capable of blocking the space current upon receiving a voltage pulse of pretermined magnitude, a meter, a circuit connecting the meter with said bias adjusting means and said shunted resistor to cause the meter to indicate their difference voltage, and a circuit including a series-connected capacitor coupling the unshunted one of said two resistors to the modulating grid whereby upon suddenly blocking the space current said modulating grid will be brought to a less negative voltage of magnitude predetermined by the meter reading.

4. In an oscilloscope circuit of the type employing a cathode and a beam intensity modulating grid, a beam intensity control and metering circuit therefor comprising an adjustable source of grid bias voltage connected to the cathode and to the modulating grid, a second voltage source, a vacuum tube repeater having a space current path, two resistors connected in series and in series with the second voltage source and the space current path, a capacitor shunting one of said two resistors, space current control means for the repeater, an input circuit for the repeater including a series connected diode capable of blocking the space current upon receiving a negative voltage pulse of predetermined magnitude but rendering said space current insensitive to positive voltage pulses, a meter, a circuit connecting the meter with said bias adjusting means and said shunted resistor to cause the meter to indicate their difference voltage, and a circuit coupling the unshunted one of said two resistors to the modulating grid whereby upon suddenly blocking the space current said modulating grid will be brought to a less negative voltage of magnitude predetermined by the meter reading.

5. In an oscilloscope circuit of the type employing a cathode and a beam intensity modulating grid, a beam intensity control and metering circuit therefor comprising an adjustable source of grid bias voltage connected to the cathode and to the modulating grid, said bias voltage source comprising two rheostats mechanically ganged together, a resistor electrically connecting said two rheostats into a series circuit, a direct current voltage source connected to said series circuit, circuits connecting said cathode and beam intensity grid to one of said rheostats whereby the grid bias voltage may be adjusted, a second voltage source, a vacuum tube repeater having a space current path, two resistors connected in series and in series with the second voltage source and the space current path, a capacitor shunting one of said two resistors, space current control means for the repeater, an input circuit for the repeater capable of blocking the space current upon receiving a voltage pulse of predetermined magnitude, a meter, a circuit connecting the meter with the other of said rheostats and said shunted resistor to cause the meter to indicate their difference voltage, and a circuit coupling the unshunted one of said two resistors to the modulating grid whereby upon suddenly blocking the space current said modulating grid will be brought to a less negative voltage of magnitude predetermined by the meter reading.

6. In an oscilloscope circuit of the type employing a cathode and a beam intensity modulating grid, a beam intensity control and metering circuit therefor comprising an adjustable source of grid bias voltage connected to the cathode and to the modulating grid, said bias voltage source comprising two rheostats mechanically ganged so their resistances always remain equal, a resistor electrically connecting said two rheostats into a series circuit, a direct current voltage source connected to said series circuit; circuits connecting said cathode and beam intensity grid to one of said rheostats whereby the grid bias voltage may be adjusted, a second voltage source, a vacuum tube repeater having a space current path, two resistors of equal resistance connected in series and in series with the second voltage source and the space current path, a capacitor shunting one of said two resistors, space current control means for the repeater, an input circuit for the repeater capable of blocking the space current upon receiving a voltage pulse of predetermined magnitude, a meter, a circuit connecting the meter with the other of said rheostats and said shunted resistor to cause the meter to indicate their difference voltage, and a circuit coupling the unshunted one of said two resistors to the modulating grid whereby upon suddenly blocking the space current said modulating grid will be brought to a less negative voltage of magnitude predetermined by the meter reading.

7. In an oscilloscope circuit of the type employing a cathode and a beam intensity modulating grid, a beam intensity control and metering circuit therefor comprising an adjustable source of grid bias voltage connected to the cathode and to the modulating grid, said bias voltage source comprising two rheostats mechanically ganged together, a resistor electrically connecting said two rheostats into a series circuit, a direct current voltage source connected to said series circuit, circuits connecting said cathode and beam intensity grid to one of said rheostats whereby the grid bias voltage may be adjusted, a second voltage source, a vacuum tube repeater having a space current path, two resistors connected in series and in series with the second voltage source and the space current path, a capacitor shunting one of said two resistors, space current control means for the repeater, an input circuit for the repeater capable of blocking the space current upon receiving a voltage pulse of predetermined magnitude, a meter, a circuit connecting the meter with the other of said rheostats and said shunted resistor to cause the meter to indicate their difference voltage, and a circuit including a series-connected capacitor coupling the unshunted one of said two resistors to the modulating grid whereby upon suddenly blocking the space current said modulating grid will be brought to a less negative voltage of magnitude predetermined by the meter reading.

8. In an oscilloscope circuit of the type employing a cathode and a beam intensity modulating grid, a beam intensity control and metering circuit therefor comprising an adjustable source of grid bias voltage connected to the cathode and to the modulating grid, said bias voltage source comprising two rheostats mechanically ganged together, a resistor electrically connecting said two rheostats into a series circuit, a direct current voltage source connected to said series circuit, circuits connecting said cathode and beam intensity grid to one of said rheostats whereby the grid bias voltage may be adjusted, a second voltage source, a vacuum tube repeater having a space current path, two resistors connected in series and in series with the second voltage source and the space current path, a capacitor shunting one of said two resistors, space current control means for the repeater, an input circuit for the repeater including a series-connected diode capable of blocking the space current upon receiving a negative voltage pulse of predetermined magnitude but rendering said space current insensitive to positive voltage pulses, a meter, a circuit connecting the meter with the other of said rheostats and said shunted resistor to cause the meter to indicate their difference voltage, and a circuit coupling the unshunted one of said two resistors to the modulating grid whereby upon suddenly blocking the space current said modulating grid will be brought to a less negative voltage of magnitude predetermined by the meter reading.

9. In an oscilloscope circuit of the type employing a cathode and a beam intensity modulating grid, a beam intensity control and metering circuit therefor comprising an adjustable source of grid bias voltage connected to the cathode and to the modulating grid, said bias voltage source comprising a rheostat, a resistor and a direct current voltage source connected in series, circuits connecting said cathode and beam intensity grid to said rheostat whereby the grid bias voltage may be adjusted, a second voltage source, a vacuum tube repeater having a space current path, two resistors connected in series and in series with the second voltage source and the space current path, a capacitor shunting one of said two resistors, space current control means for the repeater, an input circuit for the repeater capable of blocking the space current receiving a voltage pulse of predetermined magnitude, a meter, a circuit connecting the meter with said biasing adjusting means and said shunted resistor to cause the meter to indicate their difference voltage, and a circuit coupling the unshunted one of said two resistors to the modulating grid whereby upon suddenly blocking the space current said modulating grid will be brought to a less negative voltage of magnitudes predetermined by the meter reading.

10. In an oscilloscope circuit of the type employing a cathode and a beam intensity modulating grid, a beam intensity control and metering circuit therefor comprising an adjustable source of grid bias voltage connected to the cathode and to the modulating grid, said bias voltage source comprising a rheostat, a resistor and a direct current voltage source connected in series, circuits connecting said cathode and beam intensity grid to said rheostat whereby the grid bias voltage may be adjusted, a second voltage source, a vacuum tube repeater having a space current path, two resistors of equal resistance connected in series and in series with the second voltage source and the space current path, a capacitor shunting one of said two resistors, space current control means for the repeater, an input circuit for the repeater capable of blocking the space current upon receiving a voltage pulse of predetermined magnitude, a meter, a circuit connecting the meter with said bias adjusting means and said shunted resistor to cause the meter to indicate their difference voltage, and a circuit coupling the unshunted one of said two resistors to the modulating grid whereby upon suddenly blocking the space current said modulating grid will be brought to a less negative voltage of magnitude predetermined by the meter reading.

11. In an oscilloscope circuit of the type employing a cathode and a beam intensity modulating grid, a beam intensity control and metering circuit therefor comprising an adjustable source of grid bias voltage connected to the cathode and to the modulating grid, said bias voltage source comprising a rheostat, a resistor and a direct current voltage source connected in series, circuits connecting said cathode and beam intensity grid to said rheostat whereby the grid bias voltage may be adjusted, a second voltage source, a vacuum tube repeater having a space current path, two resistors connected in series and in series with the second voltage source and the space current path, a capacitor shunting one of said two resistors, space current control means for the repeater, an input circuit for the repeater capable of blocking the space current upon receiving a voltage pulse of predetermined magnitude, a meter, a circuit connecting the meter with said bias adjusted means and said shunted resistor to cause the meter to indicate their difference voltage, and a circuit including a series connected condenser coupling the unshunted one of said two resistors to the modulating grid whereby upon suddenly blocking the space current said modulating grid will be brought to a less negative voltage of magnitude predetermined by the meter reading.

12. In an oscilloscope circuit of the type employing a cathode and a beam intensity modulating grid, a beam intensity control and metering circuit therefor comprising an adjustable source of grid bias voltage connected to the cathode and to the modulating grid, said bias voltage source comprising a rheostat, a resistor and a direct current voltage source connected in series, circuits connecting said cathode and beam intensity grid to said rheostat whereby the grid bias voltage may be adjusted, a second voltage source, a vacuum tube repeater having a space current path, two resistors connected in series and in series with the second voltage source and the space current path, a capacitor shunting one of said two resistors, space current control means for the repeater, an input circuit for the repeater including a series-connected diode capable of blocking the space current upon receiving a negative voltage pulse of predetermined magnitude but rendering said space current insensitive to positive voltage pulses, a meter, a circuit connecting the meter with said bias adjusting means and said shunted resistor to cause the meter to indicate their difference voltage, and a circuit coupling the unshunted one of said two resistors to the modulating grid whereby upon suddenly blocking the space current said modulating grid will be brought to a less negative voltage of magnitude predetermined by the meter reading.

JOHN J. MAHONEY, JR.